(12) United States Patent
Nicolaos et al.

(10) Patent No.: US 8,216,324 B2
(45) Date of Patent: Jul. 10, 2012

(54) PROCESS FOR THE PRODUCTION OF HYDROGEN WITH A THERMALLY-INTEGRATED DESULFURIZATION UNIT

(75) Inventors: Alexandre Nicolaos, Fontenay le Fleury (FR); Michel Thomas, Lyons (FR); Fabrice Giroudiere, Orlienas (FR); Jijun Xu, Buffalo Grove, IL (US); Kishore Doshi, Amelia Island, FL (US)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 1137 days.

(21) Appl. No.: 12/057,576

(22) Filed: Mar. 28, 2008

(65) Prior Publication Data
US 2009/0246119 A1 Oct. 1, 2009

(51) Int. Cl.
| B01J 7/00 | (2006.01) |
| B01J 8/00 | (2006.01) |
| C01B 3/36 | (2006.01) |
| C01B 6/24 | (2006.01) |
| C01B 3/24 | (2006.01) |
| C01B 3/26 | (2006.01) |

(52) U.S. Cl. .......... 48/197 R; 48/61; 423/644; 423/650; 423/651; 422/625

(58) Field of Classification Search .......... 48/61, 197 R; 423/644, 650, 651; 422/625
See application file for complete search history.

(56) References Cited

U.S. PATENT DOCUMENTS

| 2002/0090327 A1* | 7/2002 | Deshpande ................... 422/190 |
| 2004/0053086 A1* | 3/2004 | Pettit et al. ..................... 429/19 |
| 2008/0083658 A1* | 4/2008 | Mesters ......................... 208/217 |
| 2008/0302246 A1* | 12/2008 | Carruthers et al. ............. 96/154 |

* cited by examiner

Primary Examiner — Matthew Merkling
(74) Attorney, Agent, or Firm — Millen, White, Zelano & Branigan, P.C.

(57) ABSTRACT

The invention relates to a process for the production of thermally-integrated hydrogen from a liquid hydrocarbon feedstock that contains sulfur-containing compounds that comprise at least one stage for heating the liquid hydrocarbon feedstock by indirect heat exchange with a hot stream, a stage for desulfurizing the heated hydrocarbon feedstock, a stage for evaporating the desulfurized hydrocarbon feedstock by indirect heat exchange with the hot stream that exits from the autothermal reformer, a stage for autothermal reforming of the hydrocarbon feedstock, and a stage wherein the carbon monoxide content in the hydrogen-rich gas that is produced is reduced in a reactor for converting carbon monoxide with water. The invention also relates to the hydrogen production installation that corresponds to this process.

5 Claims, 3 Drawing Sheets

PROCESS FOR THE PRODUCTION OF HYDROGEN WITH A THERMALLY-INTEGRATED DESULFURIZATION UNIT

FIELD OF THE INVENTION

The invention relates to the field of the production of hydrogen-rich gas by reforming a liquid hydrocarbon feedstock that previously required desulfurization.

The hydrogen is used as a raw material in numerous chemical applications. It is an alternative fuel, which makes it possible to supply, for example, fuel cells. The latter have become an absolute necessity in this field because they provide a response to the production of non-polluting energy.

Various processes are used for the production of a gas that contains hydrogen:

Partial oxidation (POX for partial oxidation according to the English terminology) is a very often catalyzed exothermic reaction that produces the following from hydrogen ($H_2$) by reaction between the feedstock and the oxygen ($O_2$) contained in, for example, air:

In the case of methane, for example: $CH_4 + \frac{1}{2}O_2 \rightarrow CO + 2H_2$ This reaction is to differentiate the following from the total oxidation (TOX for total oxidation) that does not produce hydrogen:

In the case of methane, for example: $CH_4 + 2O_2 \rightarrow CO_2 + 2H_2O$

Vapor Reforming (SMR for steam reforming according to the English terminology) is an also catalytic endothermic reaction that produces hydrogen by reaction of the feedstock with water ($H_2O$):

In the case of methane, for example: $CH_4 + H_2O \rightarrow CO + 3H_2$

The autothermal reforming (ATR for autothermal reforming according to the English terminology) is the coupling of the partial oxidation reaction and vapor reforming.

Whereby the exothermicity of the partial oxidation compensates for the endothermicity of the vapor reforming, an autothermal reformer can be adiabatic, apart from the heat losses. This operating mode is therefore important for the management of energy. In addition, it leads to a synthesis gas (mixture of carbon monoxide (CO), carbon dioxide ($CO_2$) and hydrogen ($H_2$)) that is richer in hydrogen than the partial oxidation. It is therefore preferred within the scope of the invention.

At the outlet of a reforming unit, the hydrogen-rich effluent gas contains many impurities, in particular carbon monoxide (CO). The latter is particularly troublesome when this hydrogen-rich gas supplies a fuel cell because the carbon monoxide poisons the catalyst of the cells. It is for this purpose that a purification unit is installed to extract the pure hydrogen.

It is known that the level of carbon monoxide can be reduced by using the reaction for conversion of carbon monoxide with water (WGS for water gas shift reaction according to the English terminology).

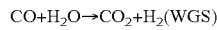

In this reaction, the water vapor that is used may be that which is present in excess in the effluent or else the water vapor that is added to the reformate. It requires the use of a suitable catalyst. It may have one or more catalytic zones there, combined or separate, at the same temperature or at different temperatures. It is common, for example, for one skilled in the art to use two separate catalytic zones, one at a high temperature (from 300 to 560° C.) upstream (high conversion temperature or HT shift according to the English terminology), one at low temperature (from 200 to 260° C.) downstream (low-temperature conversion or LT shift according to the English terminology). At the outlet of a reactor for converting carbon monoxide with water, the percentage by volume of carbon monoxide (CO) is generally about 0.5 or higher. The effluent also contains water and carbon dioxide ($CO_2$). According to the degree of purity that the user wishes to obtain, it is suitable to use an additional purification means.

One possibility is to use a system for purification by adsorption (PSA for pressure swing adsorption according to the English terminology). This technology makes it possible to obtain hydrogen of very high purity (higher by 99.9% by volume) from a reformate after conversion of the carbon monoxide. The PSA is based on the principle of adsorbing impurities in molecular sieve beds. The regeneration is obtained by expansion of the adsorption bed and flushing by an internal purge gas. The continuity of the system is ensured by the concurrent installation of several tanks.

Another possibility consists in a reaction of preferred oxidation (PrOx for preferential oxidation according to the English terminology).

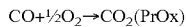

This reaction is conducted in a reactor that contains a suitable catalyst at a temperature that promotes the oxidation of the carbon monoxide with the oxygen of the air in the presence of hydrogen but without consuming or oxidizing substantial amounts of hydrogen or leading to the inverse reaction of the conversion of carbon monoxide with water (RWGS for Reverse Water Gas Shift in English terminology).

Membrane purification is also a system that is used frequently.

The large-scale hydrogen production processes are used primarily in industries that need pure hydrogen for certain chemical operations, or in the provisioning of stationary fuel cells. The advantage of these large installations is the possibility of maximizing the hydrogen yield by integrating very strongly and in a complex way all of the units of the installation. It is also possible to use expensive construction materials that are resistant to very high temperatures. The small-scale pure hydrogen production processes are a response to the problem of transport and storage of hydrogen. Small units, less costly and more mobile, make it possible to have a hydrogen source that is close to the installation that requires it.

A hydrocarbon feedstock in liquid form, such as, for example, ethanol, is easier to manipulate for a user than a gaseous feedstock. However, the use of a liquid feedstock poses the additional problem of the evaporation of this feedstock. Actually, before entering the autothermal reformer, the feedstock is to be in vapor form and mixed with water vapor and air. The process is therefore, on the one hand, to evaporate the liquid feedstock, and, on the other hand, to produce the water vapor that is necessary to the reaction. It is difficult under these conditions to design a totally autothermal process without thereby reducing the yield of pure hydrogen of the installation.

Moreover, the liquid hydrocarbon feedstock very often contains undesirable substances such as sulfides or chlorides. For example, for legal reasons, the ethanol that is not used in the food sector is denatured by the addition of a chemical substance that is called a denaturing agent and that makes it unfit for consumption. The denaturing agent can be gasoline, such as, for example, in the United States, or else thiophene. The presence of these sulfur-containing and chlorine-containing compounds in the hydrocarbon feedstock is very disturbing because they can poison the catalysts that are used for the reforming, in particular the catalysts that are present in the reforming reactor and in the reactor for converting carbon monoxide with water. In addition, they can also be found in the hydrogen that is produced and can deactivate the catalysts of the fuel cells that operate with said hydrogen.

Various methods for removing the sulfur-containing compounds from hydrocarbons are well known to one skilled in the art. In general, the sulfur-containing compounds are first hydrolyzed in a catalytic reactor and converted into hydrogen sulfide ($H_2S$). The passage of the gas into a reforming reactor also has the effect of converting the sulfur-containing compounds into hydrogen sulfide. This hydrogen sulfide ($H_2S$) is then captured by an adsorbent bed that generally consists of zinc or iron oxide, but also zeolite or nickel oxide.

PRIOR ART

Numerous processes for desulfurization of liquid or gaseous hydrocarbon feedstocks are described in the prior art.

The process for desulfurization of a hydrocarbon feedstock that is proposed in the Patent Application WO 2006/065459 uses one or more reactors that contain a hydrolysis catalyst for hydrolyzing at least one sulfur-containing compound and an adsorbent material for removing hydrogen sulfide from the feedstock. The desulfurization process that is described in the Patent Application EP 0421500 also uses a hydrolysis catalyst followed by, this time, a catalyst that allows the conversion of hydrogen sulfide into elementary sulfur. For its part, the desulfurization process that is described in the U.S. Pat. No. 5,882,614 uses two different chemical adsorbents, one following the other, optimally to remove the sulfur-containing compounds from a gaseous hydrocarbon feedstock.

Certain patents of the prior art also propose a coupling of the desulfurization process with a reforming process that aims at the production of a hydrogen-rich gas.

The Patent Application WO 2004/033367 proposes a process for continuous production of hydrogen from typically gaseous hydrocarbon feedstocks that contain sulfur-containing compounds. To purify the feedstock before its reforming, said feedstock is brought into contact with one of the adsorbent catalytic beds, in a reversible way certain sulfur-containing radicals. During this time, the catalyst of the bed or of the other beds is regenerated using a regeneration gas. As an alternative, the various catalytic beds are regenerated, which makes possible a continuous operation of the process.

The U.S. Pat. No. 6,159,256 describes a method for desulfurization of a hydrocarbon feedstock using a reactor that contains the nickel that converts the sulfur-containing compounds into nickel sulfide. The hydrogen-rich gas that is produced can be used as a fuel by a fuel cell, after having been purified. This reactor system that contains nickel makes it possible to design a small-scale hydrogen production unit because a single reactor of correct dimensions for a portable installation is adequate to desulfurize the hydrocarbon feedstock. This desulfurization reactor operates at a temperature of between 250° F. and 525° F., or approximately between 120° C. and 275° C.

The Patent Application EP 1236495 proposes a solution to the problem caused by the start-up of an installation for desulfurization of a hydrocarbon feedstock that is bound for hydrogen production. The invention consists in a reactor for trapping sulfur-containing compounds that is active at low temperature, i.e., below 75° C.

SUMMARY DESCRIPTION OF THE INVENTION

The invention relates to a process for the production of hydrogen that is integrated thermally from a liquid hydrocarbon feedstock that contains sulfur-containing compounds that comprise:

A stage a wherein the liquid hydrocarbon feedstock is heated by indirect heat exchange with a hot stream selected from among the following streams: the stream that exits from the autothermal reformer that was previously cooled by heat exchange with one or more other streams, the stream that exits from the reactor for converting carbon monoxide with water, and the stream that exits from the reactor for converting carbon monoxide with water previously cooled by heat exchange with one or more other streams, A stage b wherein said hydrocarbon feedstock, heated during stage a, is introduced into a desulfurization unit and exits therefrom, A stage c wherein said hydrocarbon feedstock that is obtained from stage b is evaporated by indirect heat exchange with the hot stream that exits from the autothermal reformer;

A stage d wherein said evaporated hydrocarbon feedstock, obtained from the stage c, is subjected to an autothermal reforming in the presence of water and a source of oxygen, so as to produce a hydrogen-rich gaseous flow, A stage e wherein the stream that is obtained from stage d is introduced into a reactor for conversion of carbon monoxide with water so as to reduce the content of carbon monoxide in the hydrogen-rich gas that is produced.

SUMMARY DESCRIPTION OF THE FIGURES

DETAILED DESCRIPTION OF THE INVENTION

Figure 1:
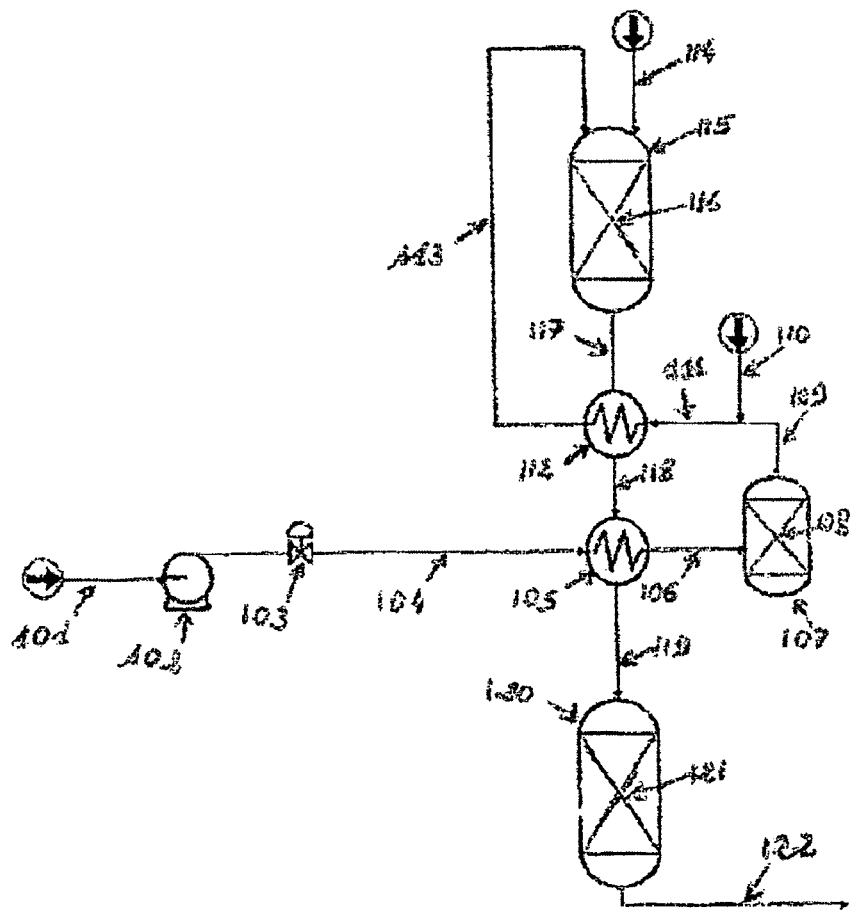
FIG. 1 is a process diagram that shows an installation variant for reforming a liquid hydrocarbon feedstock according to the invention.

The invention is suitable for the reforming of liquid hydrocarbon feedstocks. It may involve hydrocarbons, petroleum fractions or alcohols, such as, for example, ethanol, or finally mixtures of the latter. A potentially advantageous fuel is bioethanol. This biofuel is presented as a long-lasting energy alternative. It is obtained by fermentation or distillation of vegetable raw materials, such as, for example, saccharose or starch. It has the advantage of having a very low level of greenhouse gas emissions. The hydrocarbon feedstock can contain sulfur-containing compounds such as compounds with the chemical formula RSH where R generally refers to an alkyl or alcohol group, but also thiophenes ($C_4H_4S$). The latter can poison the catalysts that are used for reforming, in particular the catalysts that are present in the reforming reactor and in the reactor for converting carbon monoxide with water. It is for this purpose that the feedstock is desulfurized before its reforming.

In addition to the hydrocarbon feedstock, the process requires an input of water. The latter is preferably deionized. Whereby the reforming reaction is an autothermal reforming, an oxygen source is necessary to the reaction. The latter can be pure oxygen, air or oxygen-enriched air.

In a first step (stage a), the liquid hydrocarbon feedstock is heated by indirect heat exchange with one of the following hot streams: the stream that exits from the autothermal reformer and that was previously cooled by heat exchange with one or more other streams, the stream that exits from the reactor for converting carbon monoxide with water, and the stream that exits from the reactor for converting carbon monoxide with water that was previously cooled by heat exchange with one or more other streams. The heat exchanger is positioned and dimensioned by one skilled in the art so that the hydrocarbon feedstock at the outlet of the exchanger reaches a temperature of between 15° C. and 250° C., preferably between 20° C. and 200° C., even more preferably between 60° C. and 150° C.

The thus heated liquid hydrocarbon feedstock is brought into contact during stage b with at least one bed of catalyst that allows the reaction and then the adsorption of sulfur-containing compounds that are contained inside a desulfurization reactor. The catalyst preferably comprises a support and an element selected in the group consisting of nickel and copper. More preferably, nickel is selected.

Preferably, said element is at least partially reduced to metallic state (that is to say that at least 30 wt %, preferably at least 50 wt % and more preferably at least 70 wt % or even at least 80 wt % of said element is reduced to metallic state). This reduction is preferably operated at a temperature above 100° C., and more preferably at least up to 180° C.

Said catalyst can be a bulk one (30 to 60 wt % of nickel, typically) or else impregnated on a support, for example alumina (20 to 30 wt % of nickel, typically). Any other support known to one skilled in the art is also possible, such as for example carbon, zeolites, or silica.

It is also possible to implement a scheme of several solids, for example an adsorbent followed by a catalyst, for a better effectiveness on thiophene. To remove the aromatic compounds such as thiophene, the adsorbent that is used upstream of the catalyst can preferably be activated alumina or silica gel, or activated carbon that is activated chemically, zeolite that is exchanged with alkali metals. Activated carbon is mostly preferred.

In the process according to the invention, the hydrocarbon feedstock can thus preferably be introduced at step b in a desulfurization unit comprising an adsorbent located upstream of said catalyst.

The desulfurization by reactive adsorption is carried out essentially by sulfurization of the reduced nickel. This corresponds to the following reaction, in the case of the RSH-type radicals:

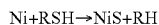

Ni+RSH→NiS+RH

This reaction produces alkanes or alcohols that correspond to the nature of the RSH compound. For its part, thiophene is chemisorbed on the surface.

The potentially present chlorinated compounds in the hydrocarbon feedstock may pose an additional problem because like the sulfur-containing compounds, they can deactivate the catalysts of the entire process. To improve the service life of said catalysts, it is considered to use modified aluminas in the desulfurization reactor to eliminate the chlorinated compounds.

The adsorption of the sulfides in a liquid phase is generally easier to implement than in a gaseous phase; actually, the useful volumes are smaller. The adsorption on the solid of the sulfur-containing radicals depends on the temperature. The adsorption is carried out generally at a temperature of between 15° C. and 250° C., generally preferably between 20° C. and 200° C. and more preferably between 60° C. and 150° C.

The implementation of this desulfurization unit makes it possible to obtain a quite high desulfurization rate: greater than 80%, preferably greater than 90%, and even between 95% and 100%. The concentration of sulfur-containing compounds in the liquid hydrocarbon feedstock is then such that it is no longer a danger for the catalyst that is contained in the reforming reactor nor for the catalyst that is contained in the reactor for converting carbon monoxide with water.

In a preferred embodiment, a water stream, in vapor form, or, preferably, in liquid form, is added to the liquid hydrocarbon feedstock that exits from the desulfurization reactor. Preferably, to maximize the thermal integration of the hydrogen production process, the amount of water that is added to the liquid hydrocarbon feedstock is as large as possible to the extent that the mixture is completely evaporated in stage c by using all the heat from the effluent from the reformer.

In a third step (stage c), the liquid hydrocarbon feedstock that is obtained from the desulfurization reactor or the mixture of water and the liquid hydrocarbon feedstock is totally evaporated by indirect heat exchange with the hot stream that exits from the autothermal reformer. The heat exchanger is positioned and dimensioned by one skilled in the art so that the hydrocarbon feedstock or the mixture of water and hydrocarbon feedstock at the outlet of the exchanger is totally evaporated. It is in general detrimental to the reforming reactor for a two-phase liquid and gas mixture to be injected into the inlet of said reactor, because the presence of droplets can generally bring about a drop in the reforming level and a loss of activity of the catalyst. At the outlet of the heat exchanger, the temperature of the evaporated hydrocarbon feedstock or of the mixture of water vapor and evaporated hydrocarbon feedstock is between 100° C. and 725° C. (725° C. being the maximum temperature allowed because of the resistance of the materials), preferably between 200° C. and 500° C., and even more preferably between 300° C. and 400° C. However, it is generally preferred that the temperature of the hydrocarbon feedstock or of the water/hydrocarbon feedstock mixture not exceed the self-ignition temperature before entering the reformer.

The evaporated hydrocarbon feedstock or the mixture of water vapor and evaporated hydrocarbon feedstock that is obtained from stage c is injected into an autothermal reforming reactor (stage d) as well as air, preferably hot, and additional water vapor, if necessary. Preferably, the water vapor that is necessary to the autothermal reforming is produced by evaporation of water by heat exchange with a hot stream of the process; in the same way, the air that is necessary to the reforming is also heated by heat exchange with a hot stream of the process. This preferred embodiment makes it possible to increase the thermal integration of the entire process. Overall, good thermal integration makes it possible to reach a quite high $H_2O/C$ molar ratio (preferably more than 3.0, more preferably more than 4.0), which makes it possible to reach a good hydrogen yield (preferably more than 60%, more preferably more than 64%) while maintaining the autothermal process, i.e., without an outside energy supply.

During stage d, the hydrocarbon feedstock is brought into contact with an autothermal reforming catalyst. For example, it may involve a commercial catalyst based on platinum and palladium on alumina as proposed by Engelhard (U.S. Pat. No. 4,844,837A) or a commercial catalyst of the SüdChemie Company. In general, any type of autothermal reforming catalyst can be used in the process according to the invention. The autothermal reforming reactor typically operates at a temperature of between 400° C. and 1000° C., but it will preferably be less than 725° C., which is the boundary temperature that an inexpensive material can support. The pressure is traditionally between 100 and 4000 kPa.

The reformate, i.e., the effluent from the reforming reactor, is a synthesis gas. The temperature of this gas is preferably more than 300° C., more preferably more than 350° C., and even more preferably between 400° C. and 725° C.

The heat of this reformate is used to evaporate the liquid hydrocarbon feedstock that is obtained from the desulfurization reactor or the mixture of water and liquid hydrocarbon feedstock that is at least partially desulfurized using a heat exchanger.

Later, the heat that remains after this first heat exchange can be used to heat one or more other streams of the process, such as, for example, the liquid hydrocarbon feedstock before desulfurization, or a water stream that is used in the process, or an air stream that is used in the process.

The reformate is then introduced during stage e into a reactor for converting carbon monoxide with water (WGS). An addition of water to the reformate may be necessary but it remains non-mandatory. This reactor is equipped with one or more catalytic zones, installed in the same chamber or in several different chambers that can operate at the same temperature or at different temperatures.

Whereby the reaction is exothermic, the effluent from the reactor for converting carbon monoxide with water is generally cooled by one or more exchangers. This heat can be used to heat one or more other streams of the process, such as, for example, the liquid hydrocarbon feedstock before desulfurization, or a water stream that is used in the process, or an air stream that is used in the process.

At the outlet of the reactor for converting carbon monoxide with water, the hydrogen-rich gas product contains about 0.5 mol % of carbon monoxide (CO) as well as water and carbon dioxide ($CO_2$).

In a preferred mode of this process, the hydrogen-rich gas that is produced is purified in a purification section. It is possible to use a preferred oxidation reactor (PrOx). In a preferred embodiment of this process, the purification section comprises a PSA system or a membrane filtration system. The unsuitable gases that are discharged by this purification section, referred to as "off-gas" according to the English terminology, are burned in a gas burner. The pure hydrogen that is then obtained can be used in any type of application, in particular for the supply of fuel cells.

Preferred Variant Embodiments of the Invention

Figure 2:
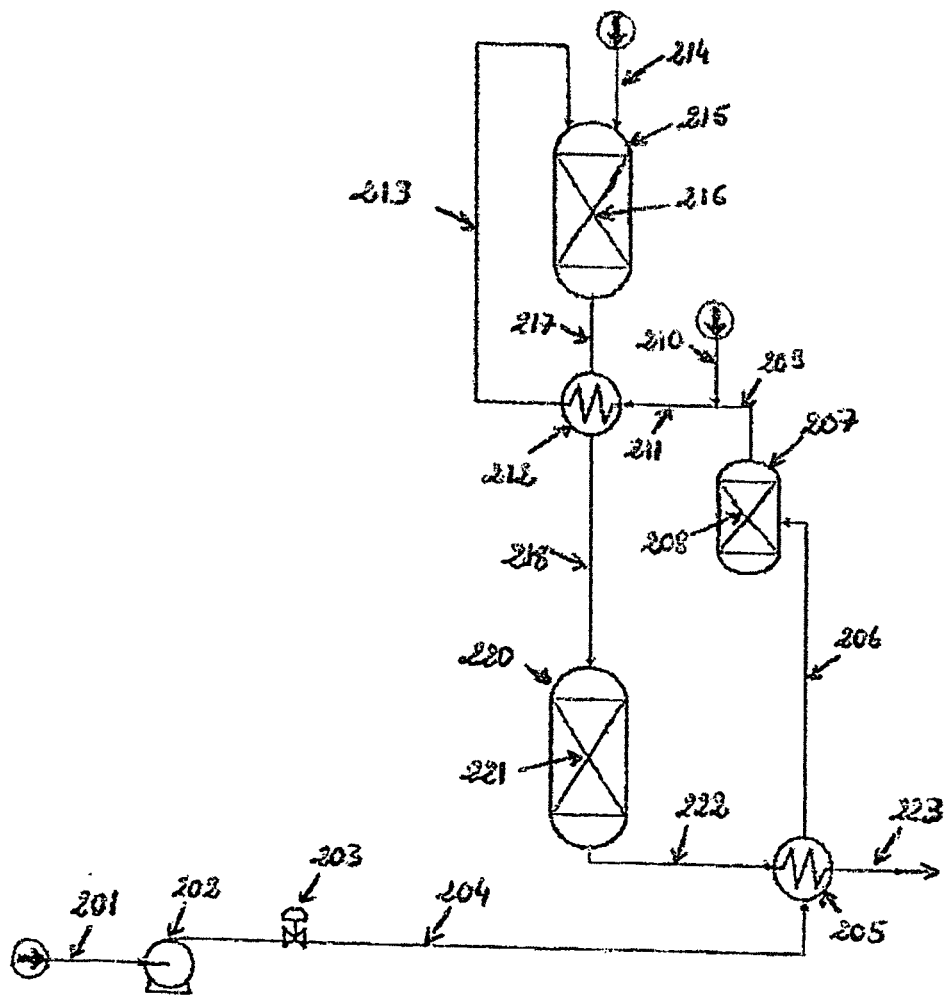
FIG. 2 is a process diagram that shows a second installation variant for reforming a liquid hydrocarbon feedstock according to the invention.
Figure 3:
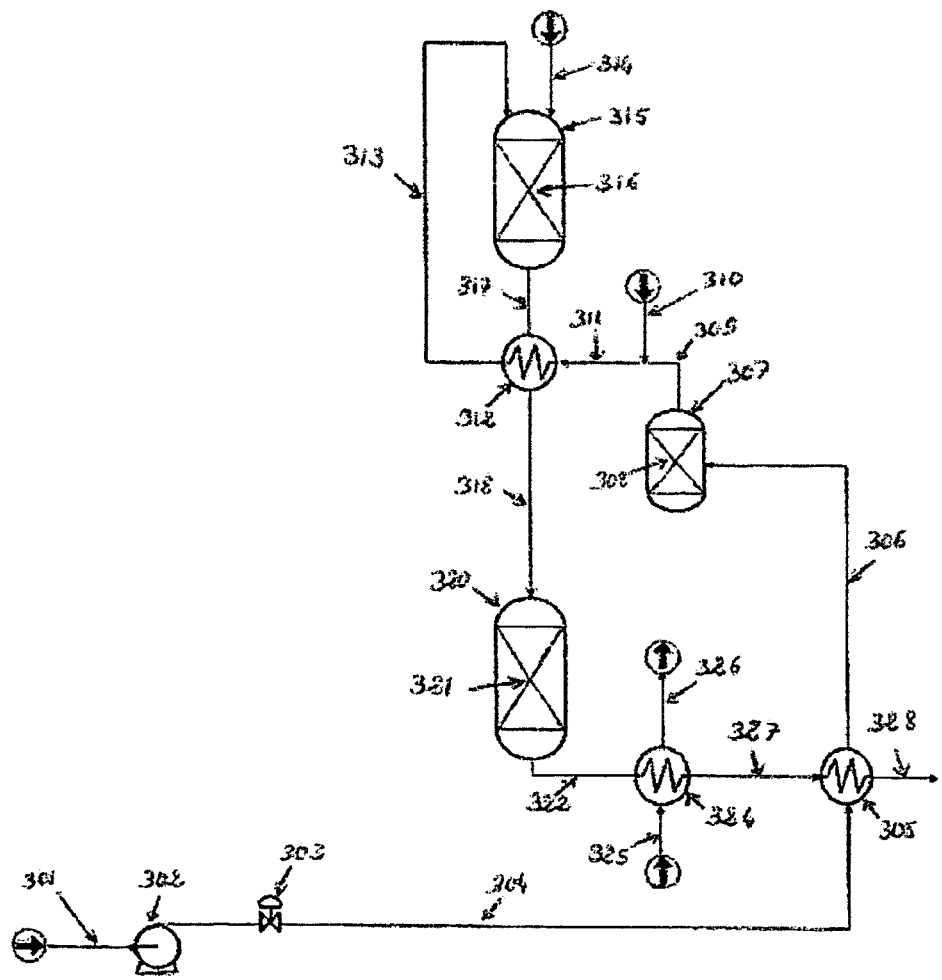
FIG. 3 is a process diagram that shows a third installation variant for reforming a liquid hydrocarbon feedstock according to the invention.

FIGS. 1 to 3 show three possible variant embodiments of the invention, i.e., a process for producing thermally-integrated hydrogen in which the liquid hydrocarbon feedstock is heated by thermal contact prior to its desulfurization by one of the following streams: the stream that exits from the autothermal reformer that was previously cooled by heat exchange with one or more other streams, the stream that exits from the reactor for converting carbon monoxide with water, and the stream that exits from the reactor for converting carbon monoxide with water, previously cooled by heat exchange with one or more other streams. Each variant proposes a different position of the heat exchanger in question in the diagram of the process for producing hydrogen.

The numbering of the FIGS. 1 to 3 is carried out in AXY form in which A is the number of the figure and XY is the number of the equipment, for example 1XY for FIG. 1 or 3XY for FIG. 3. The numbers X and Y are identical for the same equipment regardless of the figure, for example 115, 215 and 315 for the reforming reactor respectively in FIGS. 1, 2 and 3.

According to the references of FIG. 1, which constitute an embodiment of the invention, the process for producing thermally-integrated hydrogen consists of a reactor 107 for desulfurizing the liquid hydrocarbon feedstock, an autothermal reforming reactor 115, a reactor for converting carbon monoxide with water (WGS) 120 and two heat exchangers 105 and 112.

The liquid hydrocarbon feedstock, for example ethanol, is introduced into the process via the line 101 and the pump 102. It enters the heat exchanger 105 via the line 104. It is then heated up to a temperature of between 15° C. and 250° C., preferably between 20° C. and 200° C., even more preferably between 60° C. and 150° C., by bringing it into contact with the hot stream that enters into the heat exchanger 105 via the line 118 and by exiting via the line 119, which is simply the stream that exits from the autothermal reformer 115 that was previously cooled by heat exchange in the exchanger 112. The thus heated liquid hydrocarbon feedstock exits from the heat exchanger 105 via the line 106 and enters the desulfurization reactor 107. It is then brought into contact with a catalytic bed 108 that generally comprises a nickel-based catalyst, containing, for example, at least 50 wt % of reduced nickel. Once sulfur-containing compounds are removed, the liquid hydrocarbon feedstock exits via the line 109. It is mixed with a liquid water stream that comes in via the line 110. This thus formed mixture of liquid water and liquid hydrocarbon feedstock is brought via the line 111 into the heat exchanger 112, where it is totally evaporated using the heat that is provided by the stream that exits from the autothermal reformer 115 via the line 117. At the outlet of the heat exchanger 112, the mixture of evaporated water and evaporated hydrocarbon feedstock reaches a temperature of between 160° C. and 725° C., preferably between 200° C. and 500° C., and even more preferably between 300° C. and 400° C. It is injected into the autothermal reforming reactor 115 via the line 113. A stream of hot air and evaporated water is also injected into the autothermal reforming reactor 115 via the line 114. In this reactor, the streams of hydrocarbon feedstock, water and air are brought into contact with an autothermal reforming catalyst 116. The result is a hydrogen-rich hot gaseous reformate that exits via the line 117. This reformate is cooled by two successive heat exchangers 112 and 105: the first brings it into contact with the mixture of water and liquid hydrocarbon feedstock that comes in via the line 111; the second brings it into contact with the cold liquid hydrocarbon feedstock that comes in via the line 105. The thus cooled reformate exits from the heat exchanger 105 via the line 119 and enters the reactor for converting carbon monoxide with water 120. In this reactor, it is brought into contact with at least one catalytic bed for converting carbon monoxide 121. At the outlet of the reactor for converting carbon monoxide 120, a hydrogen-rich gas, whose content of carbon monoxide (CO) is less than 0.6 mol %, preferably less than 0.5 mol %, is obtained via the line 122.

According to the references of FIG. 2, a second embodiment of the invention, the process for producing thermally integrated hydrogen also comprises a reactor 207 for desulfurizing the liquid hydrocarbon feedstock, a reactor for autothermal reforming 215, a reactor for converting carbon monoxide with water (WGS) 220 and two heat exchangers 205 and 212. The difference relative to FIG. 1 is in the positioning of the exchanger 205 in the diagram of the process.

The liquid hydrocarbon feedstock, introduced into the process via the line 201 and the pump 202, and which is heated in the heat exchanger 205, is in contact with the hot stream that exits via the line 222 of the reactor for converting carbon monoxide with water 220. The liquid hydrocarbon feedstock that is thus heated exits from the heat exchanger 205 via the line 206 and proceeds along the same path in the process as in the first example: it enters the desulfurization reactor 207 that contains at least one catalytic bed 208 that generally comprises a nickel-based catalyst, containing, for example, at least 50 wt % of reduced nickel. Once sulfur-containing compounds are removed, the liquid hydrocarbon feedstock exits via the line 209 and is mixed with a liquid water stream that comes in via the line 210. The thus formed mixture of liquid water and liquid hydrocarbon feedstock is brought via the line 211 into the heat exchanger 212, where it is totally evaporated using the heat that is supplied by the stream that exits from the autothermal reformer 215 via the line 217. It is injected into the autothermal reforming reactor 215 that contains an autothermal reforming catalyst 216 via the line 213. A stream of hot air and evaporated water is also injected into the autothermal reforming reactor 215 via the line 214. A hydrogen-rich hot gaseous reformate exits via the line 217 of the reforming reactor 215. This reformate is cooled by the heat exchanger 212 that brings it into contact with the mixture of liquid hydrocarbon feedstock and water that comes in via the line 211. The thus cooled reformate exits via the line 218 and enters the reactor for converting carbon monoxide into the water 220 that contains a suitable catalyst 221. At the outlet of the reactor for converting carbon monoxide 220, a hot hydrogen-rich gas is obtained via the line 222. This heat is exchanged with the cold liquid hydrocarbon feedstock before its desulfurization using the heat exchanger 205. The cooled hydrogen-rich gas, whose carbon monoxide (CO) content is less than 0.6 mol %, preferably less than 0.5 mol %, escapes via the line 223.

The variant of the process for producing hydrogen according to the invention that is proposed in FIG. 3 [is] nearly identical to the variant that is proposed in FIG. 2 except in the final phase of the hydrogen-rich gas treatment.

According to the references of FIG. 3, the hydrogen-rich hot gas that exits from the reactor for converting carbon monoxide with water 320 via the line 322 is first cooled by indirect heat exchange in an additional heat exchanger 324. The heat of the hydrogen-rich hot gas makes it possible to heat a stream that enters via the line 325 and exits via the line 326. For the purpose of optimizing the thermal integration of the process, this stream is preferably an evaporated liquid water stream, or a superheated water vapor stream, or a stream of heated air, which is useful in the process for producing hydrogen, for example by being introduced into the reforming reactor, for example via the line 314. The exiting hydrogen-rich gas, cooled by the heat exchanger 324 via the line 327, is also hot enough to make it possible to heat the cold liquid hydrocarbon feedstock before its desulfurization using the heat exchanger 305. The cooled hydrogen-rich gas whose carbon monoxide (CO) content is less than 0.6 mol %, preferably less than 0.5 mol %, escapes via the line 328.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of hydrogen that is integrated thermally from an ethanol liquid hydrocarbon feedstock that contains sulfur-containing compounds, said process comprising:
    (a) heating ethanol liquid hydrocarbon feedstock by indirect heat exchange with a hot stream which is: a stream from an autothermal reformer that was previously cooled by heat exchange with one or more other streams, a stream exiting a reactor converting carbon monoxide with water, or a stream exiting from a reactor converting carbon monoxide with water that was previously cooled by heat exchange with one or more other streams, wherein the temperature of the liquid hydrocarbon feedstock at the outlet of the heat exchanger of (a) is between 60° C. and 150° C., and the temperature of the evaporated hydrocarbon feedstock at the outlet of the heat exchanger of (c) is between 300° C. and 400° C.;
    (b) introducing hydrocarbon feedstock, heated during stage a, into a desulfurization unit,
    (c) evaporating hydrocarbon feedstock obtained from (b) by indirect heat exchange with hot stream exiting from the autothermal reformer;
    (d) subjecting evaporated hydrocarbon feedstock, obtained from the stage c, to an autothermal reforming in the presence of water and a source of oxygen, so as to produce a hydrogen-rich gaseous stream;
    (e) introducing the hydrogen rich gaseous stream that is obtained from d into a reactor for converting carbon monoxide with water so as to reduce the content of carbon monoxide in hydrogen-rich gas produced.

2. The process according to claim 1, wherein the temperature of the hydrogen-rich gaseous stream at the outlet of the autothermal reforming reactor in (d) is between 300° C. and 725° C.

3. The process according to claim 1, wherein the hydrocarbon feedstock is introduced in (b) into a desulfurization unit that contains a catalyst comprising a support and nickel or copper, and wherein at least 30 wt % of said nickel or copper is in the metallic state.

4. The process according to claim 3 wherein the hydrocarbon feedstock is introduced in (b) into a desulfurization unit comprising an adsorbent located upstream of said catalyst.

5. The process according to claim 1, wherein a stream of water in liquid form is added to the liquid hydrocarbon feedstock that exits from the desulfurization reactor between (b) and (c).

\* \* \* \* \*